United States Patent [19]
Vogel et al.

[11] Patent Number: 5,704,572
[45] Date of Patent: Jan. 6, 1998

[54] METHOD AND APPARATUS FOR FASTENING

[75] Inventors: Mark A. Vogel, Frankfort; James E. deBeers, Hinsdale, both of Ill.

[73] Assignee: Illinois Tool Works Inc., Glenview, Ill.

[21] Appl. No.: 540,558

[22] Filed: Oct. 6, 1995

[51] Int. Cl.⁶ .................................................. F16L 3/08
[52] U.S. Cl. .............................. 248/65; 411/383; 248/68.1
[58] Field of Search ............................. 248/65, 544, 68.1,
248/71, 546, 900, 909; 411/34, 546, 999,
970, 969, 41, 383

[56] References Cited

U.S. PATENT DOCUMENTS

| | | | |
|---|---|---|---|
| 3,023,989 | 3/1962 | White | 248/68 |
| 3,174,386 | 3/1965 | Lewis | 411/10 |
| 3,531,071 | 9/1970 | Kubli | 248/68 |
| 3,599,915 | 8/1971 | Soltysik | 248/68 |
| 3,856,244 | 12/1974 | Menshen | 248/54 R |
| 3,982,304 | 9/1976 | Menshen | 24/73 |
| 4,037,810 | 7/1977 | Pate | 248/68 |
| 4,061,073 | 12/1977 | Easter et al. | 85/62 |
| 4,214,723 | 7/1980 | Voorhees, Jr. | 248/68 |
| 4,238,165 | 12/1980 | Wagner | 411/546 |
| 4,244,544 | 1/1981 | Kornat | 248/68 |
| 4,289,061 | 9/1981 | Emmett | 411/34 |
| 4,435,112 | 3/1984 | Becker | 411/546 |
| 4,541,602 | 9/1985 | Potzas | 248/544 |
| 4,887,948 | 12/1989 | Calmettes | 411/5 |
| 4,889,457 | 12/1989 | Hageman | 411/10 |
| 5,054,983 | 10/1991 | Froewis et al. | 411/480 |
| 5,072,785 | 12/1991 | Dressler et al. | 165/47 |
| 5,209,440 | 5/1993 | Walker | 248/68.1 |
| 5,234,185 | 8/1993 | Hoffman et al. | 248/56 |
| 5,271,588 | 12/1993 | Doyle | 248/68.1 |
| 5,577,854 | 11/1996 | Jacob et al. | 411/546 |

Primary Examiner—Leslie A. Braun
Assistant Examiner—Willie Berry, Jr.
Attorney, Agent, or Firm—Schwartz & Weinrieb

[57] ABSTRACT

A method and apparatus for retaining a body member with a load member fastened to a mounting surface by a support member. The load member includes a contact surface engageable by the support member, and the body member includes a throughhole for receiving at least a portion of the load member. A breakable flash connection couples the load member to the body member so that at least a portion of the load member is disposed in the throughhole of the body member. The flash connection is breakable upon moving the load member relative to the body member with the support member in contact with the contact surface of the load member, wherein the load member retains the body member and isolates the body member from stress imparted by the support member to reduce deformation of the body member. The body member may be a part of a panel or be configured with clips for retaining other articles. The apparatus preferably is a unitary member formed of a molded plastic material.

20 Claims, 3 Drawing Sheets

METHOD AND APPARATUS FOR FASTENING

FIELD OF THE INVENTION

The invention generally relates to a method and apparatus for fastening, and more specifically to a method and apparatus for retaining a body member with a load member fastened to a mounting surface by a support member. The load member is coupled to the body member by a breakable flash connection which is broken during fastening of the load member to the mounting surface wherein the load member isolates the body member from stress imparted by the support member to reduce deformation of the body member.

BACKGROUND OF THE INVENTION

It is well known to fasten articles to a mounting surface with a bolt, rivet, pin or other support member which extends through a bore or throughhole in the article and into the mounting surface. A problem that commonly arises with articles fastened in this manner is that the support member imparts stress to the fastened article resulting in fatigue, deformation, and even fracture of the article, which ultimately will require replacement, possibly result in serious injury, have an adverse effect on reliability, and in any event increase cost. This problem has been partially addressed in U.S. Pat. Nos. 4,889,457 and 4,887,948, which generally disclose a deformable washer disposed between a flange portion of the support member and the fastened article to indicate when a specified compressive load has been applied to the article. In many instances however application of the compressive load is not accurately or consistently administered during installation. The torque applied to the bolt by an automated production line for example often varies within some tolerance range which may or may not be known. The deformable washer has the disadvantage that it only indicates when a threshold compressive load has been applied. The deformable washer however does not prevent application of an excessive compressive load that gives rise to the stress related problems discussed above.

The problem of reducing excessive compressive loading on the article has been partially addressed in U.S. Pat. No. 5,054,983 which discloses a unitary member with a compressible sleeve concentrically formed within a hollow shaft having an annular head for mounting insulation panels. The unitary member is insertable in a hole formed in the panel so that the annular head abuts an outer surface of the panel, and a nail is driven into and through the hollow shaft to fasten the panel onto a mounting surface. A flange portion of the nail contacts and compresses the compressible sleeve to absorb any excess energy thereby preventing the annular head from damaging the panel by becoming recessed in the outer surface of the panel. This unitary member however requires laborious pre-installation assembly including the drilling of holes in the panel and insertion of a unitary member in each hole prior to application of the nails. The unitary member also has the disadvantage that the annular head applies a substantial compressive force on the panel upon application of the nail because the compressible sleeve is not structurally isolated or separate from the panel. In addition, this compressive load may in part be necessary to properly seat the unitary device in the panel. In an alternative embodiment, the compressible sleeve is formed separate from the hollow shaft, but in this embodiment the compressible sleeve includes a bead about its outer circumference that introduces lateral expansive forces on the panel, which in addition to the compressive load applied to the panel are stressful and deforming. Moreover, manufacture and assembly of the separate compressible sleeve increases cost, and complicates installation.

The problem of excessive compressive loading on the article has also been partially addressed in U.S. Pat. No. 4,289,061 which discloses a compressible hollow cylindrical insert disposable in a recess of the fastened article. A fastening member extends through the compressible insert and through a bore in the article to fasten the article to a mounting surface. The compressible insert is sized to protrude above a surface of the article so that a flange portion of the fastening member first engages and compresses the compressible insert as it is driven into the mounting surface. The compressible insert may include corrugations or a groove about its outer surface so as to facilitate uniform deformation of the insert under compression by the fastening member and thereby absorb a substantial portion of the load applied to the fastener during installation. The spacing between the outer surface of the insert and the inner surface of the recess is dimensioned to prevent lateral load on the article from binding contact between the insert and the article. The compressible insert however has the disadvantage that it applies a compressive load to the article since the recess does not extend through the article resulting in stress and deformation to the article after installation. In addition, the flange portion of the fastening member applies a compressive load on the outer surface of the article. Furthermore, the compressible insert is specified to have a lower coefficient of expansion than the article thereby teaching away from the formation of a unitary member. The separate compressible insert also has the further disadvantages of increased cost for manufacture and pre-installation assembly, tedious and time consuming assembly, and the possibility of loss of the separate insert during handling and pre-installation.

OBJECTS OF THE INVENTION

In view of the discussion above, there exists a demonstrated need for an advancement in the fastening art. It is therefore an object of the present invention to provide a novel method and apparatus for retaining a body member with a load member fastened to a mounting surface.

It is also an object of the invention to provide a novel method and apparatus for retaining a body member with a deformable load member that isolates the body member from stress imparted by a support member that fastens the load member to a mounting surface so as to reduce deformation of the body member.

It is another object of the invention to provide a novel method and apparatus for fastening that is economical to manufacture and install.

It is a further object of the invention to provide a novel method and apparatus for fastening that does not require pre-installation assembly of a separate load member with the body member.

It is still a further object of the present invention to provide a novel method and apparatus for fastening that includes a body member comprised of first and second body member portions retained by a load member fastened to a mounting surface, wherein the first and second body members are held in locking engagement and include resilient clips for engaging mid retaining hoses, cables, and other articles.

SUMMARY OF THE INVENTION

Accordingly, the present invention is directed toward a novel method and apparatus for retaining a body member with a load member fastened to a mounting surface by a support member extendable through a throughhole of the load member and into the mounting surface. The load member includes a contact surface engageable by the support member, and the body member includes a throughhole for receiving at least a portion of the load member. A breakable flash connection couples the load member to the body member so that at least a portion of the load member is disposable in the throughhole of the body member. The flash connection is breakable upon moving the load member relative to the body member with the support member in contact with the contact surface of the load member so as to fasten the load member to the mounting surface. The load member is deformable under compression by the support member and isolates the body member from stress imparted by the support member so as to reduce deformation of the body member. In one embodiment, the body member is part of a panel or other article. In another embodiment, the body member includes first and second mating body member portions configured with clips for retaining hoses, cables and other articles. The apparatus may be made from a plastic, metal or synthetic material, and preferably is a unitary member manufactured by molding, casting, forging or other means known in the art.

BRIEF DESCRIPTION OF THE DRAWINGS

These and other objects, features and advantages of the present invention will become more fully apparent upon consideration of the following Detailed Description of the Invention with the accompanying drawings in which like structure and steps are referenced by corresponding numerals and indicators throughout the several views, and wherein:

FIG. 3a is a partial top view of the embodiment of FIG. 2a.

FIG. 4a is a partial bottom view of the embodiment of FIG. 2a.

DETAILED DESCRIPTION OF THE INVENTION

Figure 1A:
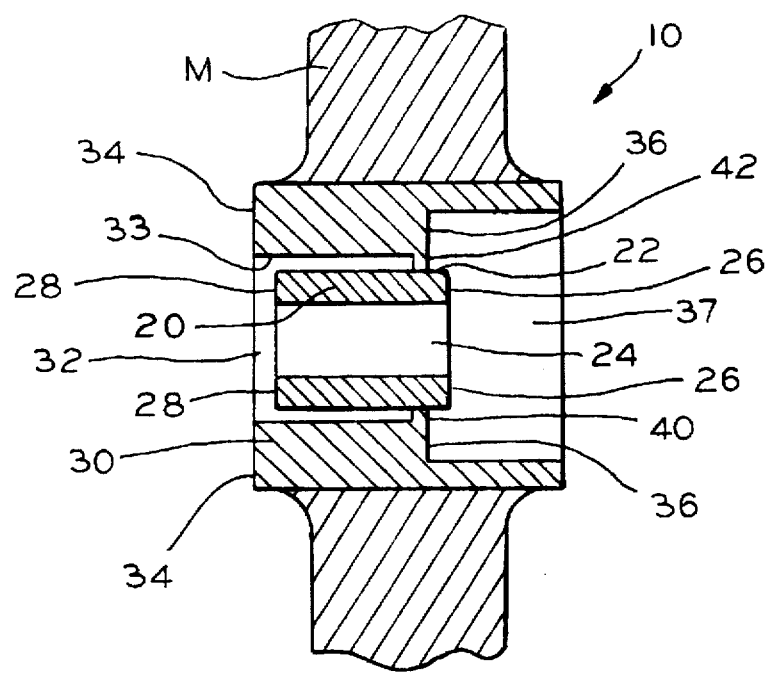
FIG. 1a is a partial sectional view of an apparatus for fastening according to one embodiment of the present invention wherein a load member is concentrically coupled to a first body member by a breakable flash connection.

FIG. 1 is a partial sectional view of an apparatus 10 for fastening according to one embodiment of the present invention generally comprising a load member 20 coupled to a first body member 30 by a breakable flash connection 40.

The body member 30 is coupled to, or an integral part of, a bracket, dip, panel or any other member M to be coupled to a mounting surface S by the apparatus as further discussed in exemplary embodiments below. The load member 20 has a cylindrical-shaped outer surface 22 and a throughhole 24 along its axial dimension, but the sectional views of FIGS. 1 and 2 may also be of a load member having a polygonal-shaped outer surface with a bore along its longitudinal dimension. The load member 20 also includes a contact surface 26 at one end and a mounting surface 28 at an opposing end, which in the embodiment shown are parallel surfaces of opposing end portions of the load member 20. The body member 30 includes a throughhole 32 with an inner surface 33 for receiving at least a portion of the load member 20. A mounting surface 34 and a contact surface 36, which may be disposed in a recess 37, are located on opposing sides of the body member 30. The contact and mounting surfaces of the load and body members 20 and 30 may be bevelled surfaces or have other shapes and appendages tailored to accommodate mating surfaces in a particular application.

The load member 20 is coupled to the body member 30 by the breakable flash connection 40 and 42 so that at least a portion of the load member 20 is disposed within the throughhole 32 of the body member 30. In one embodiment, the flash connection 40 extends from the inner surface 33 of the body member 30 to the outer surface 22 of the load member 20, and may be formed of one or more isolated tabs 42 or a continuous circumferential connection bridging the load member 20 and the body member 30. The flash connection 40 is preferably of sufficient strength to couple the load member 20 to the body member 30 during pre-installation handling yet breakable during installation to allow separation of the load member 20 from the body member 30 as further discussed below. In the embodiment of FIG. 1, the axial dimension of the load member 20 is greater than the axial dimension of the body member 30 as measured between the respective contact and mounting surfaces 26, 28 and 36, 34. The contact surface 26 of the load member 20 protrudes relative to the contact surface 36 of the body member 30 when coupled by the flash connection 40. The thickness of the flash connection 40, relative orientation, spacing between the load and body members 20 and 30, and other dimensions are not necessarily proportional and may be exaggerated for clarity. The embodiments of the apparatus may be formed of a plastic, metal or synthetic material, and preferably are a unitary member formed by molding, casting, forging or other means known in the art. Material choice, or resin choice in the plastic, may be determined by load requirements for a given application.

Figure 1B:
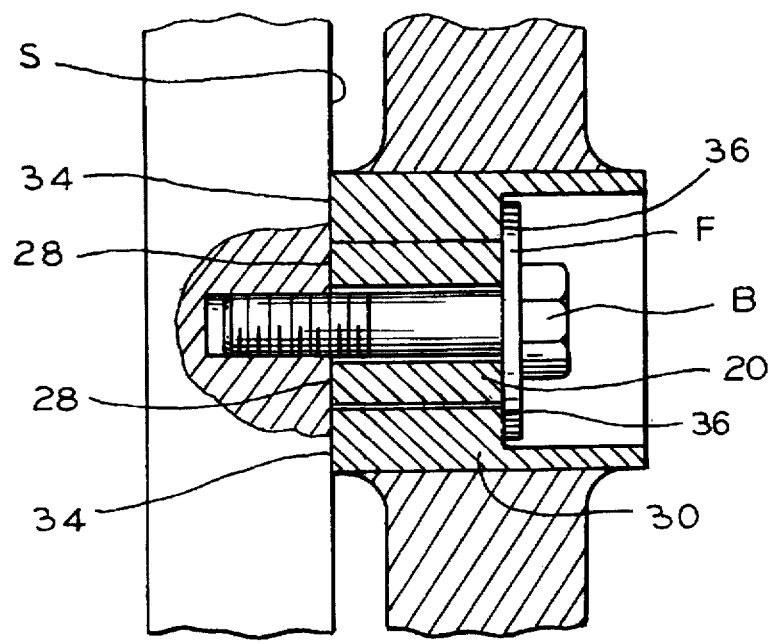
FIG. 1b is a partial sectional view of the embodiment of FIG. 1a wherein the flash connection is broken by a support member that fastens the load member to a mounting surface.

FIG. 1b is a partial sectional view of the embodiment of FIG. 1a wherein the flash connection 40 is broken by a support member B fastening the load member 20 to a vertical mounting surface S. The mounting surface S however may be in any spatial orientation. The support member B may be a bolt, pin, rivet, dowel or other member alone or in combination with a flange or washer portion F and includes at least a portion capable of engaging and moving the contact surface 26 of the load member 20 so as to break the flash connection 40. In one embodiment, the flange F extends over the contact surface 26 of the load member 20 and partially extends over the contact surface 36 of the body member 30. In one mode of operation, the mounting surface 34 of the body member 30 is positioned on the mounting surface S, and the support member B is extended through the throughhole 24 of the load member 20 and driven toward and into the mounting surface S. As the support member B is driven into the mounting surface S, it first contacts the contact surface 26 of the load member 20 protruding above the contact surface 36 of the body member 30 and moves the load member 20 relative to the body member 30 so as to break the flash connection 40 thereby separating the load member 20 from the body member 30. As the mounting surface 28 of the moving load member 20 contacts the mounting surface S, the load member 20 is subject to increased stress and deformation imparted by the support member B during and after fastening the load member 20 to the mounting surface S. The spacing between the load member 20 and the body member 30 permits expansion of the deformed load member 20, compressed by the support member B after the flash connection 40 breaks, to isolate the body member 30 from stress imparted by the support member B and reduce deformation of the body member 30. The outer surface 22 of the load member 20 is engageable with the inner surface 33 of the body member 30 to provide support to the body member 30 without imparting stress to reduce deformation of the body member 30. To further retain the body member 30, for example to prevent rotation and vibration relative to the load member 20 and mounting surface S, the support member B may be advanced to engage the flange portion F with the contact surface 36 of the body member 30 wherein the body member 30 is at least partially isolated from stress and deformation imparted by the support member B. To still further retain the body member 30, the spacing between the load and body members 20 and 30 may be dimensioned to permit more or less binding contact between the outer surface 22 of the deformed load member 20 and the inner surface 33 of the body member 30 to at least partially isolate the body member 30 from stress and deformation imparted by the support member B. The body member 30 however may be supported by the deformed load member 20 without contact by the flange portion F of the support member B or binding contact by the deformed load member 20 so as to substantially isolate the body member 30 from stress and deformation imparted by the support member B. In an alternative configuration, the axial dimension of the load member 20 may be the same or less than the axial dimension of the body member 30 wherein the flange portion F of the support member B is limited to extend over at least a portion of the contact surface 26 of the load member 20 but not the contact surface 36 of the body member 30 thereby permitting the support member B to move the load member 20 through the throughhole 32 of the body member 30. In this alternative embodiment, wherein the axial dimension of the load member 20 is the same as or less than the body member 30, the support member B may include other means for further retaining the body member 30, for example a second flange portion that engages the body member 30 without imparting undue stress or deformation thereto after the load member 20 has been separated from the body member 30. In another embodiment, the recess 37 of the body member 30 is covered with a cap with a seal, not shown in the drawing, to conceal and protect the support member B.

Figure 2A:
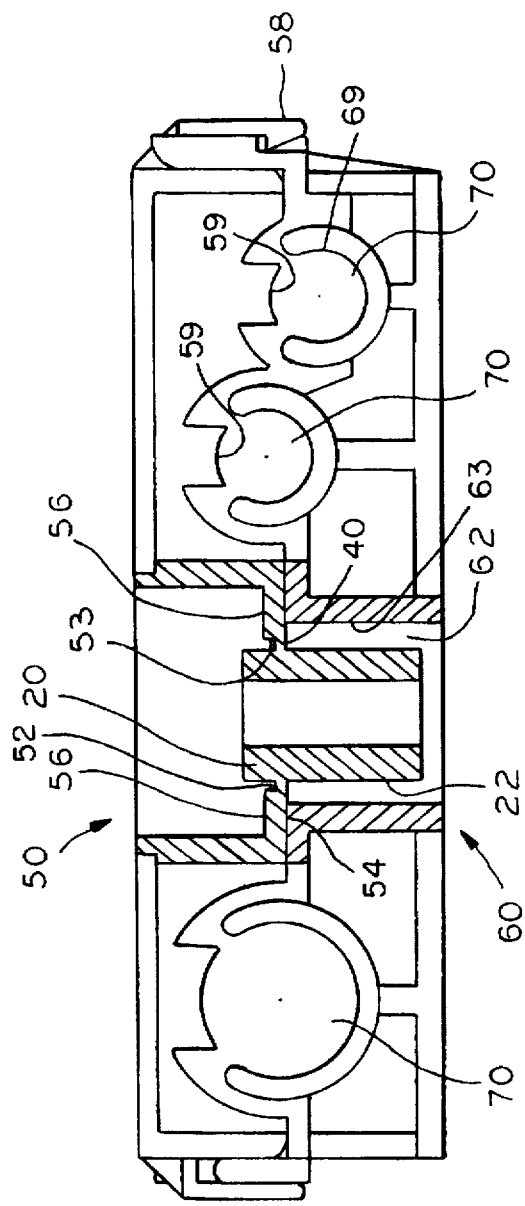
FIG. 2a is a partial sectional view of an apparatus for fastening according to an alternative embodiment of the present invention including first and second body members with a plurality of clips for engaging and retaining cylindrical-shaped articles.
Figure 2B:
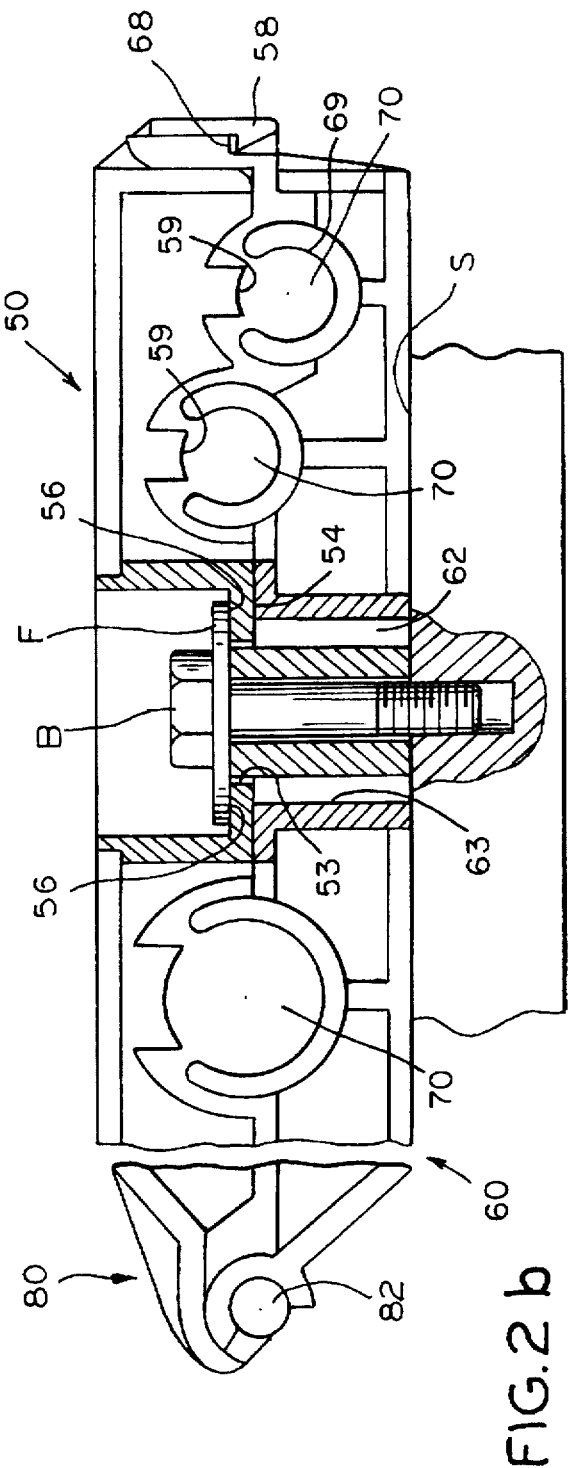
FIG. 2b is a partial sectional view of the alternative embodiment of FIG. 2a wherein the flash connection is broken by a support member fastening the load member to a mounting surface, and the first and second body members are coupled at one end by a hinge.
Figure 3A:
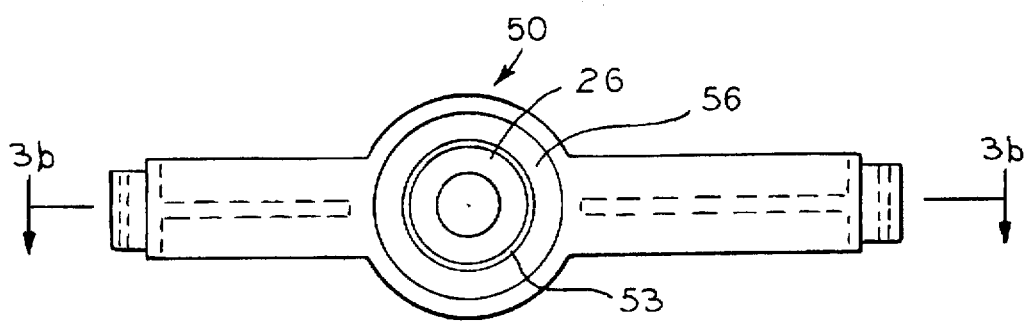
Figure 3B:
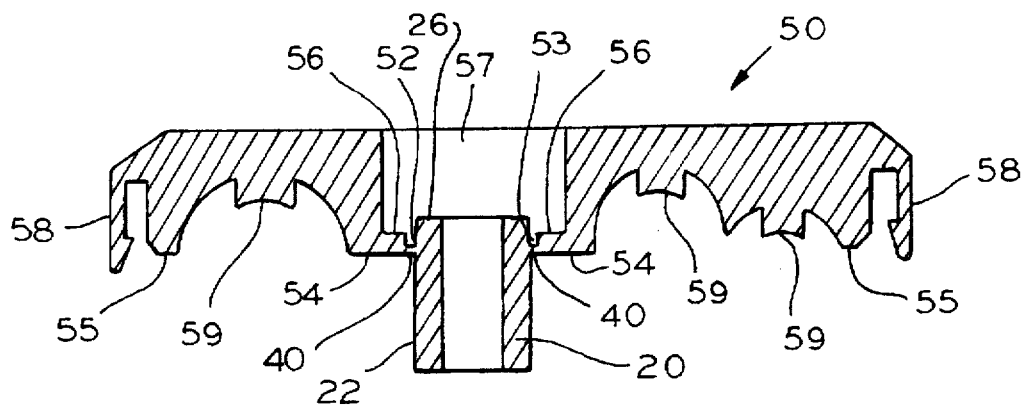
FIG. 3b is a sectional view of the embodiment of FIG. 3a along lines 3b—3b.
Figure 4B:
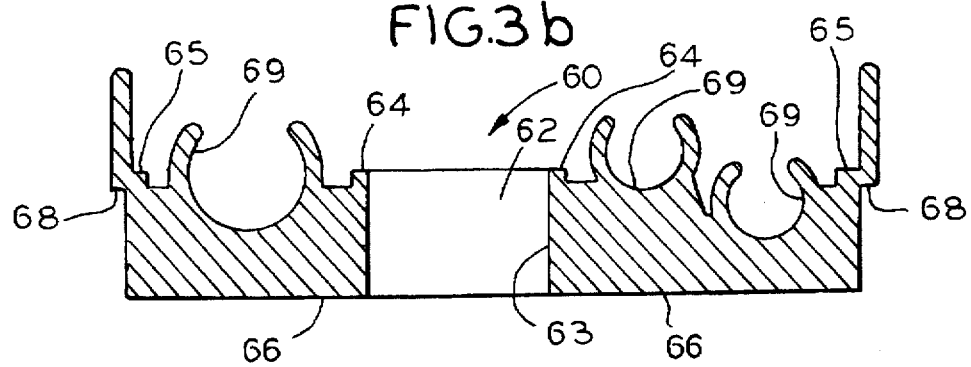
FIG. 4b is a sectional view of the embodiment of FIG. 4a along lines 4b—4b.
Figure 4A:
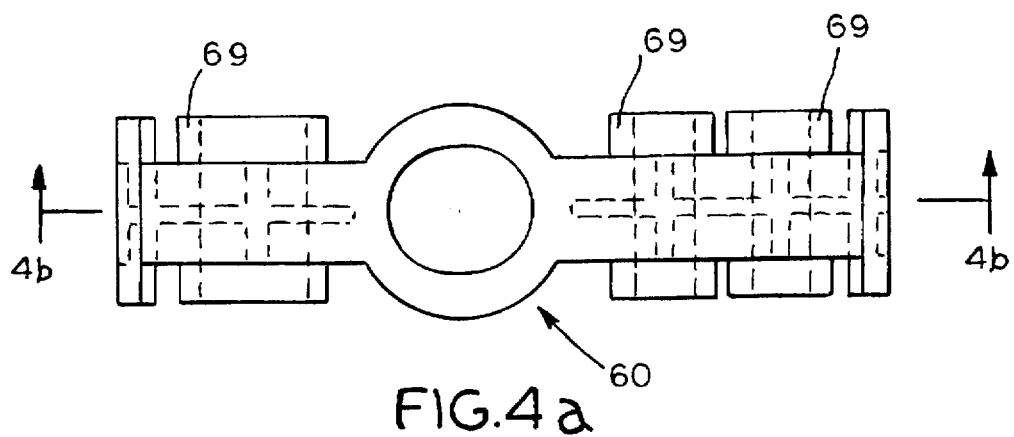

FIG. 2a is a partial sectional view of an apparatus for fastening according to an alternative embodiment of the present invention wherein the body member comprises a first body member portion 50 engageable with second body member portion 60, which portions 50, 60 may include a plurality of clips 70 for retaining cables, hoses or other articles. FIG. 2b is a partial sectional view of the alternative embodiment of FIG. 2a wherein the flash connection 40 is broken by a support member B fastening the load member 20 to a horizontal mounting surface S. The horizontal mounting surface S however may be in any spatial orientation. FIG. 3a is a partial top view of the first body member 50 of the embodiment of FIG. 2a, and FIG. 3b is a sectional view of FIG. 3a along lines 3b—3b. The first body member 50 includes a first throughhole 52 with an inner surface 53 for receiving a portion of the load member 20, an inner mating surface 54 located on one side of the first body member 50 and a contact surface 56, which may be disposed in a recess 57, located on an opposing side of the first body member 50. Additionally, the first body member 50 may include outer mating surfaces 55 for aligning and contacting the second body member 60 as well as retaining members 59 for retaining a cable, hose or other cylindrical article as further discussed below. FIG. 4a is a partial bottom view of the second body member 60 of the embodiment of FIG. 2a, and FIG. 4b is a sectional view of FIG. 4a along lines 4b—4b. The second body member 60 includes a throughhole 62 with an inner surface 63 for receiving at least a portion of the load member 20, an inner mating surface 64 engageable with the inner mating surface 54 of the first body member 50 when the throughhole 62 is aligned with the throughhole 52 of the first body member 50, and a mounting surface 66 for mating with the mounting surface S. Additionally, the second body member 60 may include outer mating surfaces 65 for engagement with a corresponding outer mating surface 55 of the first body member 50, and retaining members 69, which in the illustrated embodiment are resilient members shaped to receive a cable, hose or other cylindrical member retained by the retaining member 50 59 of the first body member. The mating surfaces, contact surface and retaining members may be bevelled surfaces or have other shapes and appendages tailored to accommodate mating surfaces and articles in a particular application. In one embodiment, the first body member is formed of a less resilient material than the material of the second body member 60, which is more resilient to permit insertion of articles in the retaining members 69 and to permit a specified deformation of the second body member 60 under load conditions. The first and second body members 50, 60 may be secured in aligned contact by resilient clips 58 disposed on opposite end portions of the first body member 50 engageable with edge portions 68 on the second body member 60. Other means may also be used to secure the first and second body members 50, 60, for example bolts. The flange portion F of the support member B may be the sole or a combined means for securing the first and second body members 50, 60 in aligned engagement as discussed below.

FIGS. 2b and 3b illustrate the load member 20 coupled to the first body member 50 by the breakable flash connection 40 so that a portion of the load member 20 is disposed within the throughhole 52 of the first body member 50 as discussed above with reference to the embodiment of and variations on FIG. 1. FIG. 2b illustrates an alternative embodiment wherein the first and second body members 50, 60 are coupled at one end by a hinge 80 that permits relative pivoting action of the first and second body members 50, 60 about a pin 82 to facilitate insertion and securing of articles in the clips 70 prior to installation of the fastening apparatus on a mounting surface S. In the hinged configuration, it is advantageous to enlarge the throughhole 62 of the second body member 60 so as to permit insertion of the load member 20 into the throughhole 62 as the first and second body members 50, 60 are pivoted toward each other into engagement. The inner surface 53 of throughhole 52 is then engageable with the outer surface 22 of the deformed load member 20 to retain the first body member 50 coupled to the second body member 60 and isolate the body member B from stress imparted by the support member. The diameter of the throughholes 52 and 62 may also be substantially the same so that the outer surface 22 of the load member 20 is engageable with the inner surfaces 53 and 63 of the throughholes 52, 62 as discussed above. In the embodiment of FIG. 2b, the flange portion F of the support member B contacts the contact portion 56 of the first body member 50 to further retain the first and second body members 50, 60, to prevent rotation or vibration relative to the mounting surface S, wherein the load member 20 is engageable with the first and second body members 50, 60 to retain and at least partially isolate the body members 50, 60 from stress and deformation imparted by the support member B. Aside from facilitating the insertion of articles in the clips 70, the combined first and second body members 50 and 60 are substantially equivalent to the body member 30 discussed above with reference to FIG. 1 insofar as the first and second body members 50, 60 are retained by the load member 20 and isolated from stress imparted by the support member B. The modes of operation and alternative embodiments discussed above therefore are generally applicable to the embodiments of FIGS. 2–4. Likewise, the alternative embodiments of the apparatus may comprise a plastic, metal or synthetic material, and preferably is a unitary member formed by molding, casting, forging or other means known in the art. Materials and dimensions may also be selected to accommodate the loading conditions of the specific application.

While the foregoing written description of the invention enables any one skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all of the embodiments within the scope of the appended claims.

What is claimed is:

1. Apparatus for fastening an article to a mounting member, comprising:
   a load member, having a contact surface and a mounting surface, and an axial throughhole extending between said contact surface and said mounting surface, adapted to be fastened to said mounting member;
   a body member having a throughhole receiving at least a portion of said load member therein;
   a breakable flash connection coupling said load member to said body member in a unitary manner so that at least a portion of said load member is disposable within said throughhole of said body member such that said load member is disposed at a first axial position with respect to said body member whereby said mounting surface of said load member is spaced from said mounting member; and
   fastening means, engageable with said contact surface of said load member and adapted for fastened connection to said mounting member, for breaking said breakable flash connection, and for axially moving said load member relative to said body member from said first axial position at which said mounting surface of said load member is spaced from said mounting member to a second axial position at which said mounting surface of said load member is disposed in contact with said mounting member so as to isolate said body member from stress imparted by said fastening means during a fastening operation and thereby reduce deformation of said body member.

2. The apparatus of claim 1, wherein:
   an axial dimension of said load member is greater than an axial dimension of said body member; and
   said load member is deformable by said fastening means when said fastening means is disposed in contact with said contact surface of said load member and said load member is mounted upon said mounting member.

3. The apparatus of claim 2, wherein:
   said body member includes a contact surface; and
   said contact surface of said deformable load member is alignable with said contact surface of said body member so that when said fastening means is engageable with said contact surface of said body member, said deformable load member at least partially isolates said body member from stress imparted by said fastening means so as to reduce deformation of said body member.

4. The apparatus of claim 3, wherein:
   said contact surface of said body member is disposed within a recess defined within said body member.

5. The apparatus as set forth in claim 3, wherein:
   said body member comprises an inner peripheral wall surface defining said throughhole thereof; and
   said load member comprises an external peripheral wall surface radially spaced from said inner peripheral wall surface of said body member prior to engagement of said fastening means with said contact surface of said load member and breaking of said breakable flash connection,
   whereby upon fastening of said fastening means with said mounting member during said fastening operation, said load member is axially compressed and radially expanded such that said external peripheral wall surface of said load member engages said inner peripheral wall surface of said body member.

6. The apparatus as set forth in claim 5, wherein:
   said fastening means comprises a flanged portion for engaging and resting upon said contact surfaces of said load member and said body member as a result of said breaking of said breakable flash connection, movement of said load member from said first axial position to said second axial position, and said axial compression and radial expansion of said load member attendant said fastening operation of said fastening means with respect to said mounting member.

7. The apparatus of claim 1, wherein:
   said body member comprises a first body member portion having said throughhole for receiving said at least a portion of said load member therein;
   said breakable flash connection couples said first body member portion to said load member; and
   said body member further comprises a second body member portion having a throughhole defined therein for also receiving at least a portion of said load member;
   said throughhole of said second body member portion having an inner peripheral surface; and
   said first body member portion is engageable with said second body member portion so as to substantially coaxially align said throughholes of said first and second body member.

8. The apparatus of claim 7, wherein:
   an axial dimension of said load member is greater than the combined axial dimensions of said engaged first and second body member portions; and said load member is deformable by said fastening means disposed in contact with said contact surface of said load member so as to axially compress and radially expand said load member.

9. The apparatus of claim 8, wherein:

said first body member portion includes a contact surface; and said contact surface of said deformable load member is alignable with said contact surface of said first body member portion so that when said fastening means is engageable with said contact surface of said first body member portion, said deformable load member at least partially isolates said first and second body member portions from stress imparted by said fastening means so as to reduce deformation of said first and second body member portions.

10. The apparatus of claim 7, wherein:

said first and second body member portions include complementary clip portions for engaging and retaining a cylindrical-shaped member, one of said clip portions having a substantially C-shaped member provided thereon for receiving a portion of said cylindrical-shaped member, and the other clip portion having an engaging member for retaining said cylindrical-shaped member within said substantially C-shaped member when said first and second body member portions are engaged with each other.

11. The apparatus as set forth in claim 7, wherein:

said first and second body member portions comprise latch means for latching said first and second body member portions together.

12. The apparatus as set forth in claim 7, further comprising:

hinge means for hingedly connecting said first and second body member portions together.

13. The apparatus as set forth in claim 1, wherein:

said load member is coaxially disposed within said body member such that said axial throughhole of said load member is coaxial with said throughhole of said body member; and said fastening means is coaxially disposed through said throughholes of said load member and said body member.

14. The apparatus as set forth in claim 1, wherein:

said load member and said body member comprise a material selected from the group of plastic and metal.

15. The apparatus as set forth in claim 1, wherein:

said fastening means comprises a fastening member selected from the group of a bolt, pin, rivet, and dowel.

16. A method of fastening an article to a mounting member, comprising the steps of:

providing a load member, having a contact surface, a mounting surface, and an axial throughhole extending between said contact surface and said mounting surface, which is adapted to be fastened to said mounting member;

providing a body member with an axial throughhole within which at least a portion of said load member is disposed as a result of said load member being coupled to said body member in a unitary manner by means of a breakable flash connection such that said load member is disposed at a first axial position with respect to said body member whereby said mounting surface of said load member is spaced from said mounting member;

inserting a fastening means through said throughholes of said load member and said body member; and driving said fastening means into contact with said contact surface of said load member and toward said mounting member thereby axially moving said load member relative to said body member from said first axial position at which said mounting surface of said load member is spaced from said mounting member toward a second axial position at which said mounting surface of said load member is disposed in contact with said mounting member, breaking said breakable flash connection coupling said load member to said body member so as to separate said load member from said body member, and fastening said fastening means to said mounting member so as to fasten said load member to said mounting member while isolating said body member from stress imparted by said fastening means during said fastening of said fastening means so as to reduce deformation of said body member.

17. The method as set forth in claim 16, further comprising the steps of:

providing said load member with an axial dimension which is greater than an axial dimension of said body member; and deforming said load member while driving said fastening means, as a result of said fastening means being driven into contact with said contact surface of said load member and said mounting surface of said load member being moved into contact with said mounting member, such that said load member is axially compressed and radially expanded, whereby said stress imparted by said fastening means during said fastening of said fastening means is impressed upon said load member and isolated from said body member.

18. The method as set forth in claim 16, further comprising the step of:

fabricating said load member and said body member from a material selected from the group of plastic and metal.

19. The method as set forth in claim 16, further comprising the step of:

forming said body member as a two-part body member comprising first and second body member portions with said load member integrally connected to said first body member portion by said breakable flash connection.

20. The method as set forth in claim 19, further comprising the step of:

providing said first and second body member portions with complementary clip portions for engaging and retaining a cylindrical-shaped member within said body member such that said cylindrical-shaped member can be mounted upon said mounting member.

* * * * *